United States Patent [19]

Jackson

[11] 4,368,224

[45] Jan. 11, 1983

[54] DECORATIVE MOLDING WITH METALLIC APPEARANCE

[75] Inventor: Norman C. Jackson, Livonia, Mich.

[73] Assignee: The Standard Products Company, Cleveland, Ohio

[21] Appl. No.: 144,367

[22] Filed: Apr. 28, 1980

Related U.S. Application Data

[63] Continuation of Ser. No. 11,083, Feb. 12, 1979, abandoned.

[51] Int. Cl.³ .............................. B32B 3/30; B32B 7/02
[52] U.S. Cl. .......................................... 428/31; 52/716; 156/244.11; 264/176 R; 428/122; 428/358
[58] Field of Search ................. 428/121, 122, 31, 358; 264/176 R; 156/244.11; 52/716

[56] References Cited

U.S. PATENT DOCUMENTS

| | | | |
|---|---|---|---|
| 3,198,689 | 8/1965 | Lansing | 428/121 |
| 3,232,818 | 2/1966 | Loew et al. | 156/276 X |
| 3,749,629 | 7/1973 | Andrews et al. | 156/276 |
| 3,922,460 | 11/1975 | Jackson | 428/31 X |
| 4,042,741 | 8/1977 | Bright | 428/122 X |
| 4,081,504 | 3/1978 | Wenrick et al. | 428/31 X |
| 4,199,325 | 10/1978 | Oakley et al. | 428/122 X |
| 4,258,100 | 3/1981 | Fujitani et al. | 428/356 X |
| 4,277,526 | 7/1981 | Jackson | 428/358 X |

FOREIGN PATENT DOCUMENTS 429774 11/1972 Australia ....................... 428/31

Primary Examiner—Henry F. Epstein
Attorney, Agent, or Firm—Harness, Dickey & Pierce

[57] ABSTRACT

A decorative and protective molding having a colored metallic appearance and an irregularly shaped cross section. The molding includes a metallic-pigment containing thermoplastic layer laminated on one portion and a decorative metallic film on another portion of the outer surface of an elongated body member.

17 Claims, 2 Drawing Figures

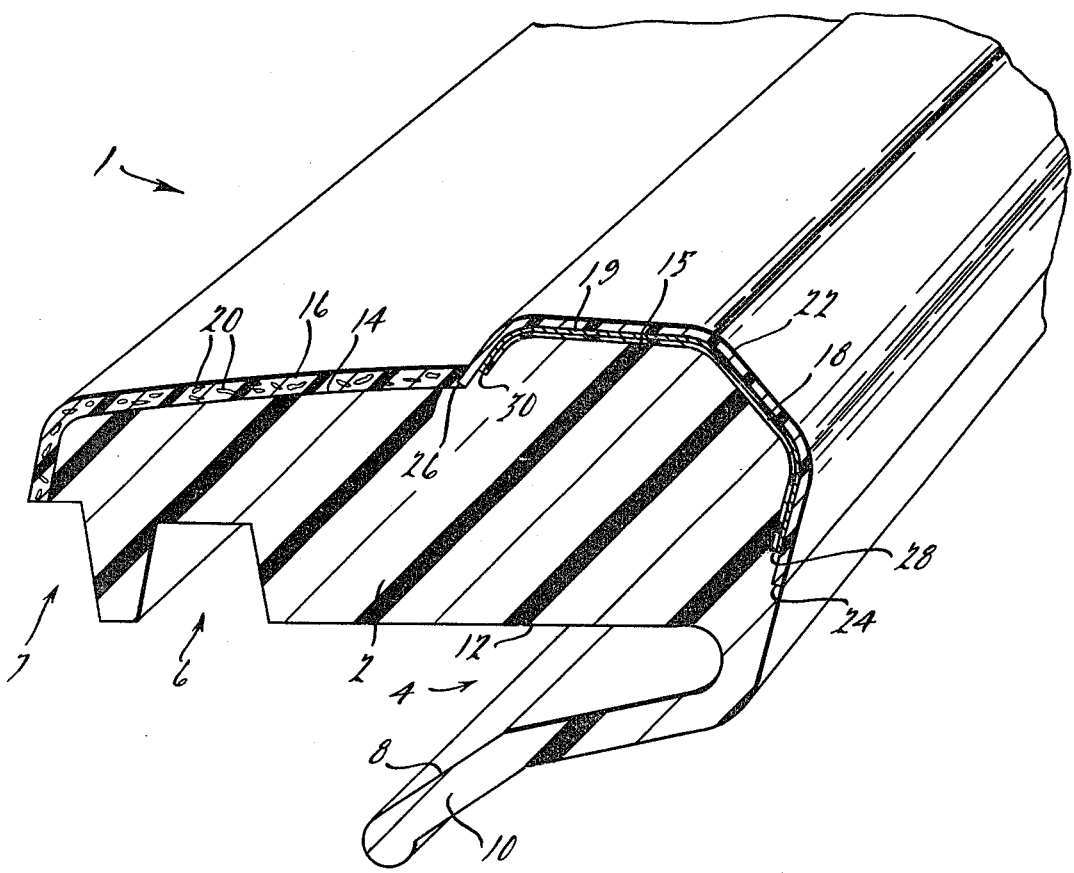
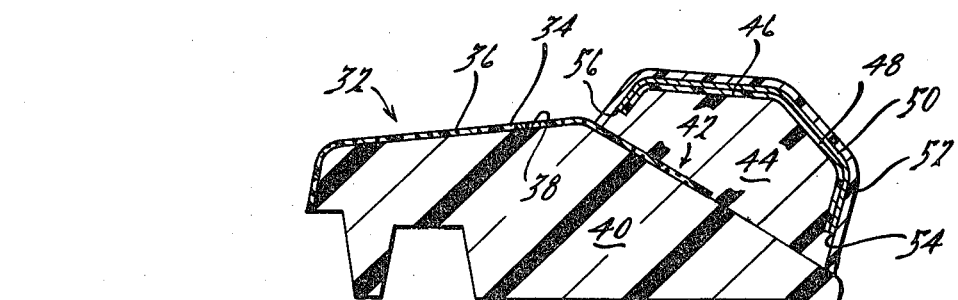

DECORATIVE MOLDING WITH METALLIC APPEARANCE

This is a continuation, of application Ser. No. 11,083, filed Feb. 12, 1979 and now abandoned.

BACKGROUND OF THE INVENTION

The present invention relates to an extruded thermoplastic decorative molding especially adapted for use in automobiles and having a colored metallic appearance which substantially matches the exterior finish of the automobile body.

Functionally shaped moldings used on automobiles, for example to frame the quarter window, are conventionally made of painted metal in order to match the appearance of the moldings with the automobile body. The moldings are conventionally secured to the body by metallic clips which have a tendency to corrode during use. Also the paint coatings tend to chip during use, detracting from the appearance of the molding. Further, the paint bond often fails as the paint ages.

Many of these problems would be alleviated by a molding formed from a thermoplastic material such as polyvinyl chloride which is largely impervious to rust and corrosion due to the elements. It has been found difficult, however, to extrude the irregular shape required of such moldings and provide a uniform distribution of metallic pigment on the surface of the molding which, of course, is required in order for the molding to match the automobile body in appearance or color as required of a decorative trim. When extruding metallic pigment-containing thermoplastic material into a molding having an irregularly-shaped cross section, the die required to give the molding its irregular shape apparently causes shear forces which disturb the flow and effect the uniformity of the distribution of metallic pigment in the thermoplastic. The end results is that the molding has streaks and presents a non-uniform appearance. On the other hand, in a simple or plain extrusion, a uniform finish can be obtained because the flow of the plastic during the extrusion is relatively smooth and undisturbed resulting in a consistent and uniform distribution of the pigment in the thermoplastic. However, a plain extrusion will not provide a molding having the irregular shape required of a functional molding.

Wherefore, it is an object of the present invention to provide a decorative molding having an irregular cross section and yet presenting a surface having a uniform, colored, metallic appearance. It is another object of the present invention to provide a molding having a surface portion which substantially matches the body of an automobile and a surface portion which presents a decorative, bright chrome-like appearance. These and other objects will be apparent from the following disclosure.

BRIEF DESCRIPTION OF THE DRAWING

FIG. 1 is a perspective view, in section and broken away, of a decorative molding made in accordance with the present invention; and FIG. 2 is a sectional view of an alternative embodiment of a decorative molding made in accordance with the present invention.

DESCRIPTION OF THE INVENTION

The molding of this invention serves a decorative function by presenting a colored metallic appearance which can be further enhanced, as shown in both embodiments illustrated in the drawing, with a bright chrome-like strip along a portion thereof. In addition, the molding also serves to protect the edge to which it is attached and when used around an automobile window can act as a drip guide to prevent water from flowing down and into the window. The molding is particularly adapted for use as a decorative and functional molding for framing the rear portion of a quarter window of an automobile and the disclosure of the present invention is cast in terms appropriate for this contemplated use of the present invention. However, it will be readily apparent to those skilled in the art that the molding of this invention can be advantageously applied to other parts of automobiles or to vans or other supporting structures such as appliances.

Now referring to FIG. 1, a molding of the present invention, generally indicated by numeral 1, has a curved top and sides and includes an elongated body 2 having an irregular cross section. Elongated body 2 is characterized by channel 6, notch 7, and cavity 4 defined by inner surface 8 of lip 10 and bottom 12 of body 2. The structure of body 2 is thus characterized by a relatively complex cross section such as is suitable to bond-onto, and be retained by, a flange for example as can be found around a quarter window of a conventional automobile. Of course, it will be apparent to those skilled in the art that other designs having relatively complex cross sections are within the broad scope of the present invention.

Laminated onto top surface area 14 of body 2 is thermoplastic layer 16. Thermoplastic layer 16 contains flaked metallic pigment 20 which imparts color and a metallic appearance thereto. Thus, thermoplastic layer 16 has an appearance substantially the same as metallic paint on an automobile body. Laminated onto top surface area 15 of body 2 is a decorative sandwich of a plastic film layer 18 which has a bright, reflective decorative layer 19 thereon. Suitable layers 18 and 19 are provided by metallized plastic film such as a metallized polyester film, for example Mylar ® film available from the duPont Company. Covering and protecting decorative layer 19 is a clear layer 22 of vinyl or other suitable transparent material. Edges 24 and 26 of clear layer 22 are imbedded in thermoplastic layer 16 and body 2 respectively. It will be appreciated by those skilled in the art that materials which can be used for decorative layer 19 are subject to discoloration if exposed to weather elements. Since edges 28 and 30 of layers 18 and 19 lie underneath clear layer 22, they are protected from exposure to the elements and decorative layer 19 is protected from resulting deterioration. It is, of course, contemplated that the ends of the elongated molding 1 will also be protected or sealed against the elements to protect decorative layer 19 by covering each end with a protective material as by end-capping or end-dipping each end.

Optimally, and not shown in the Figure, an additional acrylic layer can be coated onto the clear vinyl layer to afford protection against deterioration of decorative layer 19 due to ultraviolet radiation. Also, of course, it will be apparent to those skilled in the art that other layers such as metal foil could be substituted for plastic film layer 18 and decorative layer 19.

In accordance with the method of the present invention body 2 and thermoplastic layer 16 are both made by separately but conventionally extruding suitable thermoplastic materials. Then thermoplastic layer 16 is laminated onto body 2. This could be done, for example, by simultaneously extruding both body 2 and thermoplastic layer 16 through separate dies and then immediately pressing them together by passing between rollers to laminate one to the other or by co-extruding the body 2 and thermoplastic layer 16 through a co-extension die. In order to provide a molding having suitable flexibility and strength it has been found that body 2 can be made of polyvinyl chloride having a durometer hardness of about 80 shore A to 60 shore D. Of course, body 2 is made by extruding through a die having the desired irregular cross section.

Since body 2 is not exposed to view when in use, there is no need to color the extrusion or to be concerned about streaking should a pigment-containing material be extruded. It is an advantage of the present invention that body 2 can be made of lower quality, less expensive material because it is protected by thermoplastic layer 16 and plastic film layer 18 having decorative layer 19 and clear layer 22 thereon. For example, inhibitors conventionally used to prevent deterioration of a molding when exposed to ultraviolet light are not necessary in body 2 since body 2 is not exposed to such light.

Thermoplastic layer 16, on the other hand, is characterized by containing a flaked, metallic pigment of a kind and in an amount sufficient to impart the desired color and metallic appearance thereto. As can be seen in the drawing, thermoplastic layer 16 is a relatively thin layer of flaked, metallic pigment-containing thermoplastic material and can be conventionally extruded through a simple die without incurring streaking problems. Thermoplastic layer 16 preferably has a thickness of from about 0.1 to about 0.5 millimeters.

Plastic film layer 18 and decorative layer 19 are laminated onto body 2 in a conventional manner. For example, if metallized Mylar is employed, the metallized Mylar and body 2 can be passed between rollers, with heat, to effect lamination.

Now referring to FIG. 2, another embodiment of a molding of the present invention is generally indicated by the numeral 32. In this embodiment, thermoplastic layer 34 containing flaked metallic pigment 36 is laminated to top surface 38 of elongated body 40 which is characterized by a complex cross section. Molding 32, like molding 1 of FIG. 1, is adapted to be bonded onto and be retained by a flange, for example, as can be found around the rear quarter window of a conventional automobile.

A portion of thermoplastic layer 34, generally indicated at 42, has a ridge 44 laminated thereon. Similarly to the embodiment of FIG. 1, laminated to top surface 46 of ridge 44 is a decorative sandwich of a plastic film layer 48 having a reflective, decorative surface 50 thereon. Covering and protecting decorative surface 50 is clear layer 52 of vinyl or other suitable transparent material. Clear layer 52 extends beyond and protects edges 54 and 56 of the decorative surface 50 from exposure to the elements and resulting deterioration. It is, of course, contemplated that the ends of elongated molding 32 will also be protected or sealed against the elements as by end-capping or end-dipping.

As in the method of making the embodiment shown in FIG. 1, the method of making molding 32 involves conventionally laminating a separately but conventionally extruded, or co-extruded, elongated body 40 and a thermoplastic, pigment-containing layer 34. Ridge 44 is bonded to thermoplastic, pigment-containing layer 34 and elongated body 40 by means of a suitable adhesive or by other conventional means as by heating until the materials bond to each other. Preferably ridge 44 is made of a relatively harder material than body 40 so that ridge 44 provides structural strength to the molding and a good foundation for plastic film layer 48 and reflective, decorative surface 50 while the use of softer material for body 40 minimizes cost and contributes to the flexibility of the molding. Plastic film layer 48 and reflective decorative surface 50, of course, are laminated to ridge 44 in the same manner as in the previous embodiment. Ridge 44 can be made by conventionally extruding a thermoplastic material.

While a preferred embodiment of the present invention has been described and illustrated above, it is to be understood that the invention may be varied within the scope of the appended claims without departing from the spirit of the invention.

What is claimed is:

1. A decorative and protective molding comprising an elongated, thin layer of extruded, homogeneous, flaked metallic pigment-containing thermoplastic material laminated onto an extruded elongated body characterized by an irregularly shaped, complex cross section having at least one channel therein.

2. The molding of claim 1 wherein said elongated body has, in addition, a bright decorative layer laminated on a portion thereof.

3. The molding of claim 2 wherein said decorative layer is coated with at least one transparent protective layer.

4. The molding of claim 3 wherein said thin layer is made of polyvinyl chloride.

5. The molding of claim 4 wherein said elongated body is made of polyvinyl chloride.

6. The molding of claim 5 wherein said elongated body has a durometer of from about 80 shore A to about 60 shore D.

7. A decorative and protective molding comprising an extruded elongated body characterized by an irregularly shaped, complex cross-section having at least one channel therein, an elongated, thin layer of extruded, homogeneous, flaked metallic pigment-containing thermoplastic material laminated onto said body, an elongated rigde laminated onto said layer of thermoplastic material, and an elongated reflective, decorative layer laminated onto said ridge.

8. A molding as recited in claim 7 wherein said ridge is harder than said body.

9. A molding as recited in claim 8 wherein said decorative layer is coated with at least one transparent protective layer.

10. The method of making an elongated molding comprising the steps of: extruding a thin layer of homogeneous, flaked metallic pigment-containing thermoplastic; extruding an elongated body having an irregular, complex cross section having at least one channel therein; and laminating said thin layer onto a portion of the surface of said elongated body.

11. The method of claim 10 wherein said thermoplastic is polyvinyl chloride.

12. The method of claim 11 wherein said elongated body is made by extruding polyvinyl chloride.

13. The method of claim 12 wherein said laminating is accomplished by passing said thin layer of metallic pigment-containing thermoplastic and said elongated body between a pair of rollers.

14. The method of claim 13 wherein said laminating is accomplished by co-extruding said thin layer of metallic pigment-containing thermoplastic and said elongated body.

15. The method of claim 11 comprising an additional step of laminating a decorative layer on a portion of the surface of said elongated body.

16. The method of claim 10 comprising the additional steps of laminating a plastic ridge on a portion of said thin layer after laminating a decorative layer on said ridge.

17. The method of claim 16 wherein said ridge is made of a harder material than said body.

* * * * *